E. COX.
ANTISKID CHAIN FOR VEHICLE WHEELS.
APPLICATION FILED JAN. 5, 1917.
1,362,851.  Patented Dec. 21, 1920.
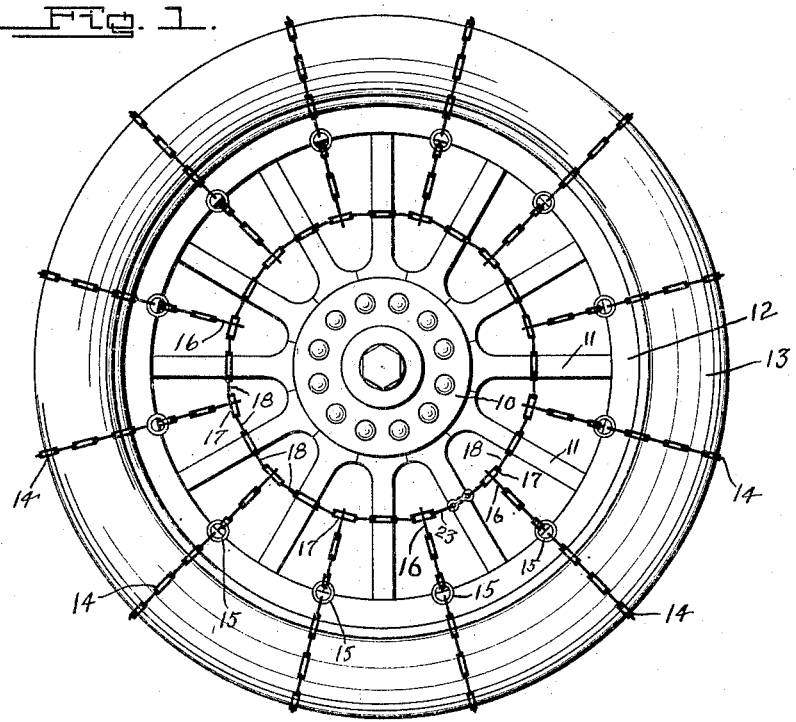
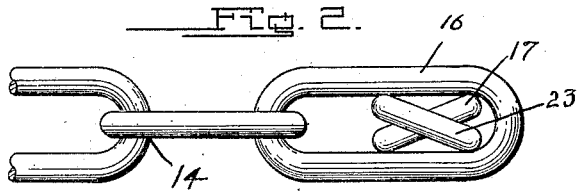
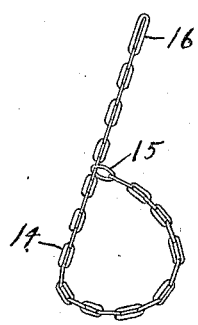
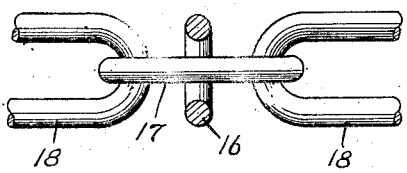
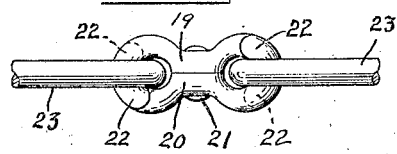
Inventor
Ed Cox.
By Lancaster
His Attorneys

UNITED STATES PATENT OFFICE.

ED COX, OF LINTON, INDIANA.

ANTISKID-CHAIN FOR VEHICLE-WHEELS.

1,362,851.  Specification of Letters Patent.  Patented Dec. 21, 1920.

Application filed January 5, 1917. Serial No. 140,786.

*To all whom it may concern:*

Be it known that I, ED COX, a citizen of the United States, and a resident of Linton, in the county of Green and State of Indiana, have invented a certain new and useful Improvement in Antiskid-Chains for Vehicle-Wheels, of which the following is a specification.

The present invention relates to anti-skid chains adapted for attachment to vehicle wheels, particularly for use on automobiles, trucks and the like.

An object of the present invention is to provide a chain of this character which is of such construction that when applied to the wheel it cannot slide circumferentially thereon, and thus cannot injure the tread or tire of the wheel by cutting into the surface of the same and peeling or chipping the tread.

The invention has for another object to provide a chain of this character which, when applied has no ends or parts which project from the wheel and which may engage the brake rods and other devices adjacent to the wheel for injuring the same, or the chain.

It is the further aim of the present invention to provide an anti-skid chain for attachment to vehicle wheels and tires wherein no fasteners are placed on the tread of the wheel so that the same cannot be injured by contact with the ground and the weight of the vehicle, and wherein but a single fastener is employed, and is so located that access may be readily had thereto and the fastener is arranged so as to at all times be spaced above the roadway and out of direct contact with mud and the like.

The above, and various other objects and advantages of this invention will be more particularly brought out in the following detailed description of the present preferred embodiment, the same being illustrated in the accompanying drawing wherein:

Figure 1 is a side elevation of a vehicle wheel having a chain constructed according to the present invention applied thereto.

Fig. 2 is a detail enlarged view of the inner free end of one of the tread sections of the chain, and a portion of the connecting section of the chain engaged therethrough and being adjusted to permit of the longitudinal sliding and adjustment of the free end of the tread section thereon.

Fig. 3 is a detail enlarged view of a portion of the connecting section of the chain, showing in section the inner end of the tread section or portion of the chain in interlocked position.

Fig. 4 is a detail perspective view of one of the tread or tire sections of the chain.

Fig. 5 is a detail enlarged side elevation of the detachable fastener employed for holding the ends of the connecting sections together.

Referring to this drawing, wherein like parts are designated by similar numerals of reference throughout the several views, 10 designates a hub of ordinary construction having spokes 11 radiating therefrom to support a rim 12 upon which is shown a pneumatic tire 13.

The chain comprises a plurality of tread or tire sections 14 and a connecting section adapted to be secured to the tread sections 14 for holding the chain in place. As shown in Fig. 4, each tread or tire section 14 comprises a single length of chain having a relatively large end or loop 15 upon one end through which is adapted to be looped the opposite free end of the chain. The free end of the chain is provided with a relatively long, flat link 16 adapted for engagement with the connecting section.

The connecting section is composed of a plurality of alternately arranged supporting links 17 and retaining or locking links 18, the same being connected together and lying in planes substantially at right angles to each other. As shown particularly in Figs. 2 and 5, end links 23 form the terminals of the connecting section. These links 17, 18 and 23 are of such width that they are capable of being turned one upon the other to approach a common plane, as shown in Fig. 2, and the links 16 of the tread sections are of such width that they may pass over the connecting sections 17 and 23, as shown in Fig. 2, when the sections 17 and 23 are turned relatively and axially to approach a common transverse plane. When the connecting section is drawn taut, however, the links 17 and 18 interfit at their adjacent ends and are thereby held at substantially right angles to each other to prevent the twisting or turning of the links one upon the other.

The free ends of the connecting section are detachably connected to each other by a fastener, such as shown in Fig. 5 in detail. The fastener in the present instance comprises a longitudinally split link providing opposed portions 19 and 20 which are pivotally connected together intermediate their ends by means of a rivet 21, and which are provided at their outer extremities with overlapping lips 22 adapted to engage the free ends of the opposite portions. These overlapping lips 22 are adapted for engagement through the ends of the adjacent rings or links 23 which are formed upon the opposite ends of the connecting section. It is readily understood that by turning the portions 19 and 20 in opposite directions about the rivet 21, the lips 22 are separated and the links 23 may be readily detached therefrom by slightly twisting or turning the links upon the ends of the connecting member.

In applying the improved anti-skid chain to vehicle wheels, any desired number of tread sections may be employed, each one of which is first engaged around the tire 13 and rim 12 with the free end of the tread section arranged against the side of the wheel and extended through the same between the spokes 11. The free end of the chain is now inserted through the loop 15 and drawn taut. The connecting section is now applied by passing the relatively narrow fastener and the links 23 through the connecting links 16 on the free ends of the tread sections. The supporting and locking links 17, 18 and 23 are collapsed as shown in Fig. 2, and the connecting portion of the device is threaded through all of the links 16 of the tread sections employed. The connecting section is now drawn taut and the detachable fastener is secured through the adjacent links 23 to hold the parts in position as shown in Fig. 1. It is readily seen that any number of the tread sections may be employed, and that the inner ends thereof are held from longitudinal displacement upon the connecting section by means of the locking links 18. The free ends of the tread sections are also located at the side of the wheel as said free ends are drawn through the spokes and threaded through the rings or loops 15, and are then drawn toward the hub of the wheel to bind the tread sections firmly about the tire and the rim. This binding of the tread sections about the tire and the rim, and the anchoring of the inner free ends thereof upon the connecting sections, prevent the circumferential displacement of the tread sections and the consequent chafing or rubbing thereof upon the tire. The tread sections therefore cannot slip to injure or chip the tire, and insure a firm gripping or catching of the wheel upon the ground. Preferably, the tread sections are arranged opposite to the spaces between each adjacent pair of spokes 11 as shown in Fig. 1 so that the spokes 11 cannot become injured by contact of the chains 14 thereagainst. It will also be noted that the connecting section of the chain is arranged in spaced relation from the hub 10 so that the latter is protected from contact with the links of the chain. When the chain is thus applied, there are no free ends to strike mud guards, brake rods and the like, and all of the connecting parts are arranged upon the side of the wheel so that access may be readily had thereto, and the device does not interfere with any of the operative parts of the vehicle to which the chain is applied. The single fastener for holding all of the parts together is arranged at the outer side of the wheel and at a point adjacent to the hub 10 and away from the tire 13 and rim 12. The fastener is thus protected and cannot be injured by contact with the roadway.

It is of course understood that various changes and modifications may be made in the details of construction of this anti-skid chain without departing from the spirit of the invention, and being restricted only by the scope of the following claim.

I claim:—

The combination with a plurality of tread chains each having an enlarged link at one end and on its other end an elongated link with a narrow elongated opening therein, a connecting chain made up of short links right angularly looped together with adjacent links adapted to be turned axially with respect to each other whereby said elongated link may be slipped thereover, the short links of the connecting chain being of greater width than the elongated opening whereby to form shoulders to limit the movement of the elongated link in either direction.

ED COX.